C. L. BECK.
SUSPENSION FOR VEHICLES.
APPLICATION FILED AUG. 20, 1920.
1,398,060.
Patented Nov. 22, 1921.
3 SHEETS—SHEET 1.
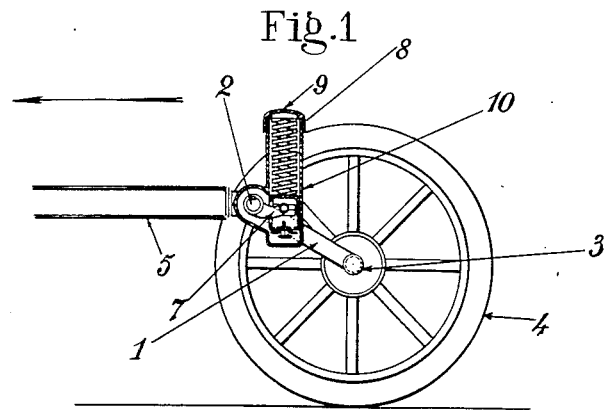
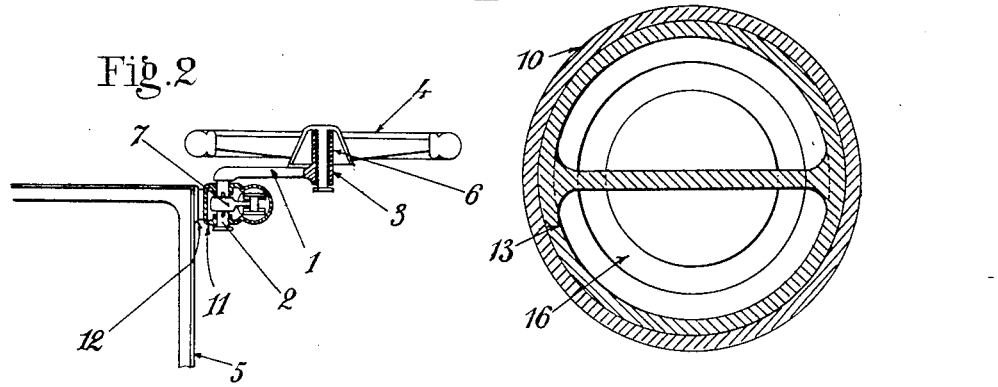
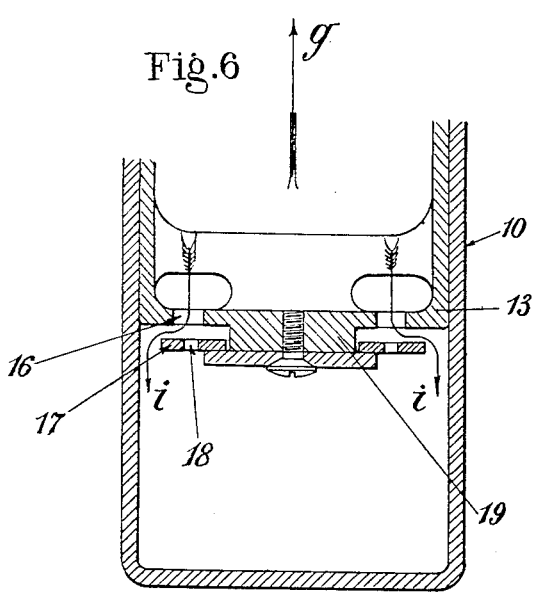
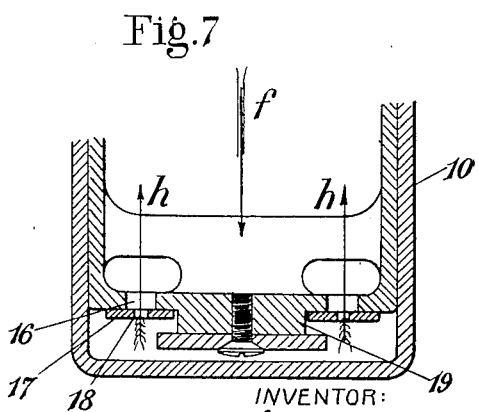
INVENTOR:
CHARLES LÉOPOLD BECK.
by *(signature)*
ATTORNEY

C. L. BECK.
SUSPENSION FOR VEHICLES.
APPLICATION FILED AUG. 20, 1920.

1,398,060.

Patented Nov. 22, 1921.
3 SHEETS—SHEET 2.

INVENTOR:
CHARLES, LÉOPOLD, BECK by
ATTORNEY.

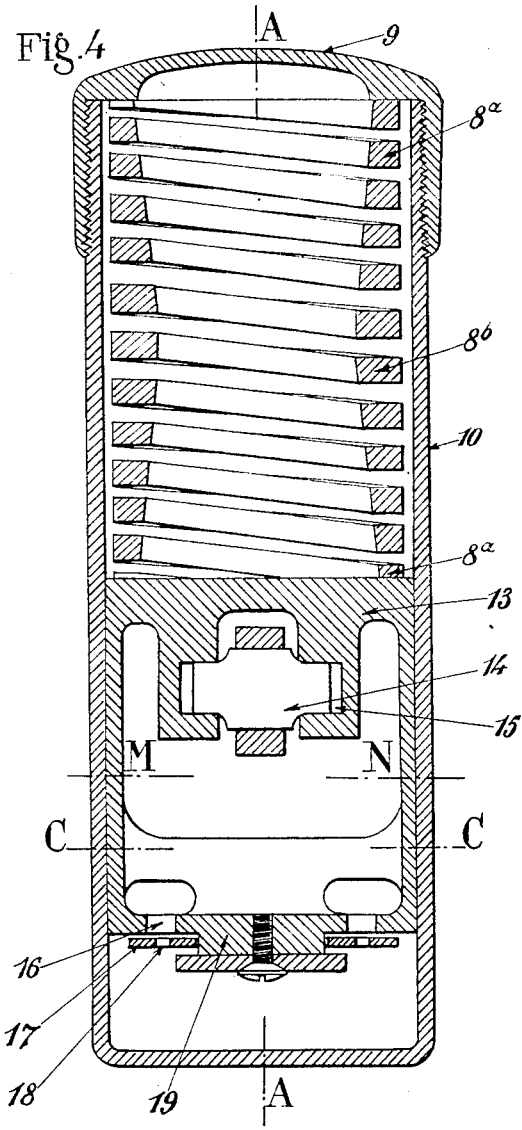

UNITED STATES PATENT OFFICE.

CHARLES LÉOPOLD BECK, OF LYON, FRANCE, ASSIGNOR OF ONE-HALF TO ARTHUR GEHENNIAUX, OF PARIS, FRANCE.

SUSPENSION FOR VEHICLES.

1,398,060.   Specification of Letters Patent.   Patented Nov. 22, 1921.

Application filed August 20, 1920. Serial No. 404,769.

*To all whom it may concern:*

Be it known that I, CHARLES LÉOPOLD BECK, citizen of the Republic of Switzerland, residing at 2 Place de la Bourse, Lyon, in the Republic of France, have invented new and useful Improvements in Suspensions for Vehicles, of which the following is a specification.

It is well known that the three conditions necessary for realizing a comfortable suspension are the following:

1. Lightness and compactness of the non-suspended parts, so as to insure these parts being relatively very light and of small mass compared with the part of the vehicle that is suspended.

2. Flexibility of the spring or suspension means variable and the resistance inversely proportional to the load.

3. Absorption of the shocks.

The vehicle suspension which is the object of the present invention fully realizes these three conditions by the combination for each wheel of:

1. A rigid piece of mechanism, connecting the non-suspended with the suspended portion consisting of a crank, one end of which is provided with a horizontal pivot firmly connected with the suspended portion of the vehicle and around which the said crank rotates, the other end of which has a crank pin on which the wheel turns.

2. A flexible device consisting of a spiral spring of special form on which on the one hand the above mentioned horizontal spindle of the crank acts and which on the other hand bears against the end of a cylindrical casing fixed rigidly to the suspended body.

3. A liquid absorption or resistance device placed in the same casing as the said spring, but below, and which is in relation with the horizontal spindle or pivot of the crank mentioned above.

In the drawing given by way of example,

Figure 1 is an elevation, with certain parts in section of the vehicle suspension according to the invention.

Fig. 2 is a sectional plan thereof.

Fig. 4 is a longitudinal axial section on the line B B (Fig. 3).

Fig. 5 is a plan section on the line C C (Fig. 4).

Fig. 6 is a partial representation of Fig. 4 showing the action of the shock absorber when the piston upstroke occurs.

Fig. 7 is a similar view, showing the action of the arrangement on the down stroke of the piston.

Figure 3:
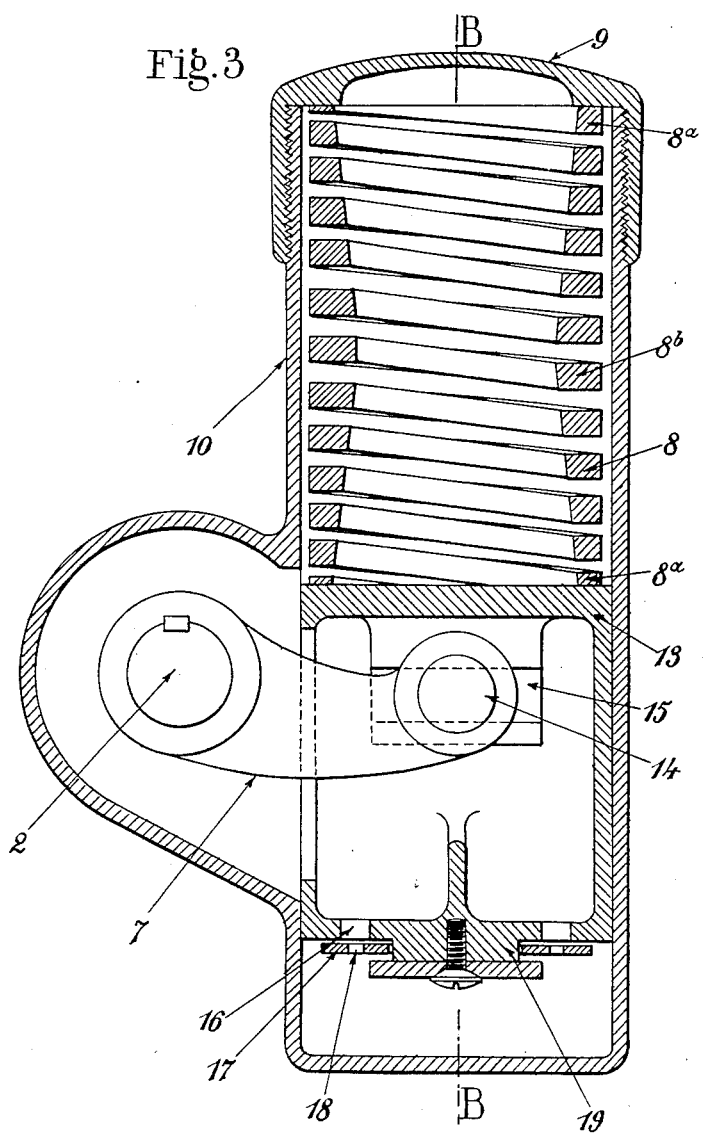
Fig. 3 is a longitudinal axial section on a larger scale on the line A A (Fig. 4) of the cylindrical gear casing containing the spiral suspension spring and the liquid resistance shock absorber.

As the drawing shows, each of the wheels is completely independent of the other and its suspension to the chassis (or frame) is effected by means of a spiral spring of special form the flexibility of which is variable.

The vehicle has no axles, these being replaced by cross beams permanently connected with the chassis, these cross beams supporting the suspension arrangement at each of their ends.

This arrangement comprises for each wheel a crank 1 one end of which is provided with a horizontal spindle or pivot 2 pivotally supported from the suspended body 5 and with which the said crank moves, the other end of which has a hollow crank pin 3 on which the wheel 4 rotates, through the medium of bearings 6. A pivoting lever 7, firmly connected with the spindle 2 and consequently with the crank 1 receives the force of a flexible device consisting of a spiral spring of special form 8. This spring bears against the end 9 of a cylindrical casing 10 cast in one piece with the bearings 11 on which the spindle 2 rotates. A face plate 12, likewise cast with the casing 10 enables the said casing to be rigidly fixed to the carrying frame or chassis 5. The wheel 4 representing the non-suspended body is thus connected with the suspended body 5 by a rigid though oscillating piece of mechanism consisting of the crank 1, its spindle 2 and its pin 3. The spiral spring 8 should produce a force so as to keep the crank in the position of equilibrium (Fig. 1) for it is indispensable in order to ensure satisfactory suspension that this crank should be inclined rearwardly, from the spindle 2 to the crank pin 3. It is now easy to understand that in this suspension arrangement the non-suspended portion of the vehicle is reduced practically to the wheel only.

The spiral spring 8 (Figs. 3 and 4) employed in the suspension is formed by an ordinary spiral spring, the coil of which has primarily a uniform rectangular section; the outside of the rectangle being parallel. This spring is then turned interiorly in such a manner that the end windings 8ª have a smaller cross section than the middle windings 8ᵇ the surface in the interior becoming a double truncated cone with the base of each toward the ends. By varying the angle of opening of these cones it is possible, as will be understood, to impart almost any required degree of flexibility to the springs.

The end windings, the coils of which have a relatively small cross, have great flexibility; under a slight load they become flattened so as to put some of them in contact with the others, only leaving the middle windings in play, which owing to their larger cross have less flexibility.

The total flexibility of the spring is thus less in proportion as the load is greater. The functional law of this kind of spring may be summarized as follows:—Under a slight load it is the end coils 8ª which act, and a very smooth spring is obtained, and under a heavy load the central coils 8ᵇ alone are free and the spring is very stiff.

The result is that the springs are regulated automatically according to the weight borne by the carriage and it will be understood that it is thus possible to obtain an equally comfortable suspension whatever may be the number of passengers occupying the vehicle.

The variability of flexion has another advantage from the point of view of the absorption by the spring of the slight wheel shocks. The small shocks caused by running over slightly uneven surfaces only bring into play the flexibility of the end windings, and consequently are not transmitted to the chassis, a considerable advantage from the suspension point of view. In the case of a rebound, the force which acts vertically on the wheels during the first shocks never becoming very great, the reaction of the wheels on rough ground is reduced to the minimum producing a smoother action on any road.

The pivoting lever 7 firmly connect with the horizontal spindle pin 2 of the crank 1 operates the piston 13 sliding in the lower part, hermetically closed, of the cylindrical casing, the pin 14 sliding in the grooves 15 of the piston.

The cylinder 10 contains glycerin up to the level M, N, so that the lower part of the piston is always immersed in all its positions.

In the lower end of the piston 13 a circular opening 16 is formed establishing communication between the interior of the piston and the lower part of the cylinder 10. A circular valve 17 in which holes 18 are formed is placed in a circular groove 19 in the lower part of the piston 13. This groove should be of a width greater than the thickness of the valve 17.

The action of the shock absorber is as follows:—It acts by leaving free the compression of the spring and consequently the raising of the wheel and by checking the expansion of the spring.

When the piston 13 is moved up (direction of the arrow g) by the lever 7 (Fig. 6) the valve 17 under the influence of its own inertia and particularly that of the lower depression comes against the lower surface plate of the groove 19 allowing the glycerin to pass freely in the direction of the arrows i, i from the upper part to the lower part while the spring is compressed.

On the other hand, when the piston moves down forced by the spring 8 (Fig. 7) in the direction of the arrow f, that is to say after the obstacle has been passed, the valve 17 under the influnece of the pressure applied by the liquid, comes against the upper part of the groove 19 thus covering up the port 16. The glycerin can no longer pass from the lower to the upper part of the piston except through the few holes 18, in the direction of the arrows h. It will be seen that the rate of descent of the piston is regulated by the sectional area given to the holes 18, the smaller the area of the holes 18, the slower will be the return movement of the piston. The advantage of this connection of the lever 7 with the piston 13 will be obvious. Unless the lever 7 be connected with the piston as shown, when the slow movement of the piston takes place, the lever 7 would move down more quickly and the points of contact of the lever and the piston would move apart for an instant and then come into collision with each other directly afterward.

It is for the purpose of avoiding these continual shocks which would quickly destroy the points of contact that the lever is connected with the piston.

Having now described my invention, what I claim as new and desire to secure by Letters Patent is:—

1. A motor vehicle comprising in combination a vehicle frame, a short axle carrying one wheel, a crank arm connected at one end to the said short axle and inclined in an upward and forward direction therefrom, a supporting member embodying a cylinder and secured to the vehicle frame, a spindle rigidly secured to the crank arm and pivotally supported in said supporting member, a lever arm shorter than the crank arm and rigidly secured to the spindle, said lever arm normally extending in a substantially horizontal plane, a coil spring tending to depress said lever arm, certain windings of said spring having a larger cross section than the others so that the flexibility of the spring varies with the load, a piston guided in the cylinder and interposed between the coiled spring and the free end of said lever arm, said cylinder containing a liquid, and means on the piston whereby the piston is free to move in one direction while its movement is checked by the liquid in the opposite direction.

2. A motor vehicle comprising in combination a vehicle frame, a short axle carrying one wheel, a crank arm connected at one end to the said short axle and inclined in an upward and forward direction therefrom, a supporting member formed of a watertight casing comprising two bearings, a flange adapted to be secured to the vehicle frame and a cylinder, a spindle rigidly secured to the crank arm and pivotally supported in the said bearings, a lever arm shorter than the crank arm and rigidly secured to the spindle, said lever arm normally extending in a substantially horizontal plane, a coiled spring in the cylinder tending to depress said lever arm, certain windings of said spring having a larger cross section than the others so that the flexibility of the spring varies with the load, a piston guided in the cylinder and interposed between the coiled spring and the free end of said lever arm, said cylinder containing a liquid and means on the piston whereby the piston is free to move in one direction while its movement is checked by the liquid in the opposite direction.

3. A motor vehicle comprising in combination a vehicle frame, short axle carrying one wheel, a crank arm connected at one end to the said short axle and inclined in an upward and forward direction therefrom, a supporting member formed of a watertight casing comprising two bearings, a flange adapted to be secured to the vehicle frame and a cylinder, a spindle rigidly secured to the crank arm and pivotally supported in the said bearings, a lever arm shorter than the crank arm and rigidly secured to the spindle, said lever arm normally extending in a substantially horizontal plane, a coiled spring in the cylinder, tending to depress said lever arm, certain windings of said spring having a larger cross section than the other so that the flexibility of the spring varies with the load, a piston guided in the cylinder and in contact with the spring, said piston being provided with transverse grooves, a sliding member carried on the free end of the lever arm and adapted to slide in said grooves, said cylinder containing a liquid and means on the piston whereby the piston is free to move in one direction while its movement is checked by the liquid in the other direction.

4. A motor vehicle comprising in combination a vehicle frame, a short axle carrying one wheel, a crank arm connected at one end to the said short axle and inclined in an upward and forward direction therefrom, a supporting member formed of a watertight casing comprising two bearings, a flange adapted to be secured to the vehicle frame and a cylinder, a spindle rigidly secured to the crank arm and pivotally supported in the said bearings, a lever arm shorter than the crank arm and rigidly secured to the spindle, said lever arm normally extending in a substantially horizontal plane, a coiled spring in the cylinder, tending to depress said lever arm, certain windings of said spring having a larger cross section than the others so that the flexibility of the spring varies with the load, a piston guided in the cylinder and in contact with the spring, said piston being provided with transverse grooves, a sliding member carried on the free end of the lever arm and adapted to slide in said grooves, said cylinder containing a liquid, the end wall of the piston being provided with an annular port and an annular valve guided on the piston and adapted to close said port and having holes formed therein.

5. In a device of the character described, the combination with a vehicle frame and a vehicle wheel, of a shock absorbing member interposed therebetween and including a coiled spring the coils of which differ in cross sectional area.

6. In a device of the character described, the combination with a vehicle frame and a vehicle wheel, of a shock absorbing member interposed therebetween and including a coiled spring the coils of which at the opposite ends of the spring are of smaller cross sectional area than the coils intermediate such ends.

7. In a device of the character described, the combination with a vehicle frame and a vehicle wheel, of a shock absorbing member interposed therebetween and including a coiled spring the coils of which gradually increase in cross sectional area from the ends toward the center of the spring whereby the inside of said spring has the shape of a double truncated cone.

In testimony whereof I have signed my name to this specification in the presence of two subscribing witnesses.

CHARLES LÉOPOLD BECK.

Witnesses:—
   JULIAN KEMBLE LUEDWEG,
   RICHARD LUEOUGEG.